United States Patent [19]

Lim et al.

[11] 4,184,020

[45] Jan. 15, 1980

[54] PREPARATION OF HYDROPHILIC MATERIAL FOR GEL CHROMATOGRAPHY

[75] Inventors: Drahoslav Lim; Jiri Coupek; Miroslava Krivakova; Svatopluk Pokorny, all of Prague, Czechoslovakia

[73] Assignee: Ceskoslovenska akademie ved, Prague, Czechoslovakia

[21] Appl. No.: 825,922

[22] Filed: Aug. 19, 1977

Related U.S. Application Data

[63] Continuation of Ser. No. 281,288, Aug. 17, 1972, abandoned, which is a continuation-in-part of Ser. No. 201,311, Nov. 23, 1971, abandoned.

[30] Foreign Application Priority Data

Nov. 24, 1970 [CS] Czechoslovakia ............... 7919-70

[51] Int. Cl.$^2$ ............................................. C08F 220/20
[52] U.S. Cl. ....................................... 521/52; 526/200; 526/201; 526/202; 526/212; 526/217; 526/312; 526/320

[58] Field of Search ............... 521/52; 526/212, 217, 526/201

[56] References Cited

U.S. PATENT DOCUMENTS

| | | | |
|---|---|---|---|
| 3,575,946 | 4/1971 | Chromecek et al. | 526/212 |
| 3,663,467 | 5/1972 | Albright | 260/2.5 B |

FOREIGN PATENT DOCUMENTS 1166223 10/1969 United Kingdom .

*Primary Examiner*—Harry Wong, Jr.

[57] ABSTRACT

This invention relates to a method for preparing globular, hydrophilic copolymers which have reticulated internal structures and are suitable for gas and gel chromatography. The method comprises polymerization by suspension polymerization methods of hydrophilic and hydrophilic monomers in aqueous medium in the presence of a component which prevents transfer of the hydrophilic monomer into the aqueous medium and the solubility of the aqueous medium in the monomeric phase.

9 Claims, 1 Drawing Figure

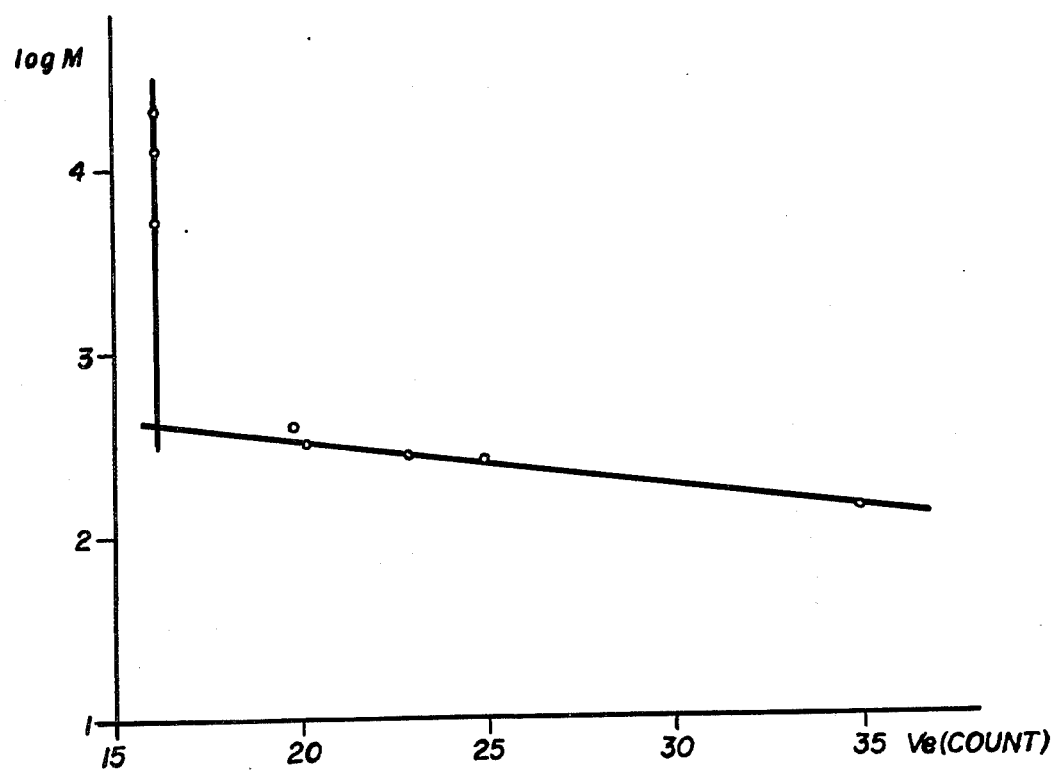

PREPARATION OF HYDROPHILIC MATERIAL FOR GEL CHROMATOGRAPHY

This application is a continuation of copending application Ser. No. 281,288, filed Aug. 17, 1972, now abandoned, which, in turn, was a continuation-in-part of application Ser. No. 201,311, filed Nov. 23, 1971, now abandoned.

BACKGROUND OF THE INVENTION

Generally, the usual method for preparation of globular, insoluble particles of a copolymer is by suspension copolymerization of a bifunctional monomer with a tetrafunctional cross-linking agent. The globular shape of the particles is necessary to achieve satisfactory efficiency when such copolymer particles are to be employed in chromatography.

Copolymerization of monomer with a small amount of cross-linking tetrafunctional comonomer results in the formation of gels which do not exhibit permanent porosity in a dry state and which swell in suitable solvents. The internal structures of such materials, as well as the degree of swelling at equilibrium thereof, are a function of the density of the cross-links, that is, the degree of cross-linking, in the copolymer and are dependent on the proportion of cross-linking monomer in the starting polymerization mixture. The gels prepared in this manner are generally homogeneous or microreticular and they are especially useful for the separation of low molecular weight compounds or oligomers having molecular weights up to about 4,000 by gel permeation chromatography. A lower density network, that is, less dense cross-linking can be achieved by decreasing the concentration of cross-linking monomer in the reaction mixture and the resulting gels are useful for separating compounds having higher molecular weight, that is, above about 4,000. On the other hand, as the concentration of the cross-linking monomer is decreased, the swollen particles of the copolymer tend to become insufficiently mechanically stable and became unsuitable as packing in chromatographic columns below a specific limit of concentration of cross-linking mononer which is dependent upon both its type and character of the monomer forming the main chain. At contents of cross-linking agent below 2% the mechanical stability is no more suited for high speed and high resolution gel chromatography. The cross-linking agents with higher affinity to the aqueous phase (diethyleneglycol dimethacrylate, methylene-bis-acrylamide etc.) require for reaching equal network density in swollen condition, a higher concentration of the cross-linking agent (about 5%). Generally, the microreticular gels so formed are not employed in gas chromatography.

The gels suitable for the separation of polymers are formed by copolymerization of a bifunctional monomer with a relatively large proportion of a cross-linking monomer, as mentioned hereinbefore, and usually in the presence of an inert component which in most cases is an organic solvent. However, the inert component may be either a solvent or precipitant of the copolymer. Due to the high concentration of the cross-linking monomer, the copolymer formed swells only very little and a separation of phases takes place during the course of the polymerization. The gels so prepared are heterogeneous. Moreover, when a precipitant for the copolymer is used as the inert component, the particles of the copolymer formed are permanently porous even in a dry state. Such permanently porous materials are macroporous or macroreticular, have considerable surface area and are used in gas chromatography. The character and amount of the inert component, as well as the concentration of the cross-linking monomer in the starting monomer mixture, are the determining factors which control the copolymer heterogeneity.

The globular polymer particles formed must be fractionated according to size before using them in chromatographic applications. Therefore, it is desirable to carry out the suspension polymerization in a manner so that most of the globules formed lie in the required region and any distribution of particle sizes is kept as low or narrow as possible. Generally, in gel chromatography, the most convenient particle size is in a range of from about $40\mu$ to about $80\mu$ and in gas chromatography in a range of about $100\mu$ to about $200\mu$. The presence of dust in the copolymer as well as the presence of particles of excessive size on non-globular shape detracts from the usefulness of the product.

Two factors or effects which negatively influence the copolymerization of hydrophilic monomer with hydrophobic comonomer in an aqueous dispersion medium are the solubility of water in the organic medium and the extraction of the hydrophilic monomer by or into the aqueous dispersion medium. When water dissolves in the monomer mixture or in the polymerizing particles, it can act as an undesirable inert component and substantially influence the structure of the resulting copolymer. On the other hand, where extraction of the hydrophilic monomer from the organic phase into the aqueous dispersion medium occurs, the ratio of both monomers in the polymerization mixture and in the polymerizing globules is changed in comparison to the initial ratio in the starting composition, and, accordingly, the network density of a homogeneous copolymer gel and the porosity of a macroporous copolymer-gel being formed are undesirably influenced. Moreover, in those cases where the hydrophilic monomer is extracted into the aqueous phase, it can also polymerize in solution and should the homopolymer so formed be insoluble in water and precipitate in the course of polymerization, it contributes to agglomeration of the suspension and complicates the subsequent fractionation. On the other hand, however, if the homopolymer formed dissolves in water, the viscosity of the dispersion medium increases during the course of the polymerization and the globular particles formed tend to have a more widely varied size distribution as they coagulate. In such cases, the stability of the suspension deteriorates substantially, the particles have an irregular shape and in the final stage the whole system collapses with the suspension precipitating partially or entirely.

These difficulties may be obviated by suppressing the solubility of the hydrophilic monomer in the aqueous phase by salting it out with a dispersion medium which is usually a concentrated solution of an inorganic salt and in which the finely dispersed water insoluble hydroxide, such as $Mg(OH)_2$ or salt is used as a suspension stabilizer. However, even when proceeding in this manner some partial dissolving of the hydrophilic monomer cannot be avoided as a rule. Furthermore, the copolymer thus obtained has to be treated to remove the suspension stabilizer therefrom. This treatment is relatively laborious and time consuming. Moreover, the problem of water solubility in monomer particles at the initiation of the polymerization is still not eliminated.

Suspension polymerization of a mixture of hydrophilic and hydrophobic monomers in a non-aqueous dispersion medium is another way in which particularly homogeneous gels having a low density of cross-links may be advantageously prepared. This method requires, however, the application of special suspension stabilizers to prevent extraction of the hydrophobic monomer into the suspension medium which is generally an organic solvent and most frequently oils and the like. Consequently, the oil phase has to be recovered after the reaction which makes the processing of the suspension relatively difficult and time consuming in this case also. Consequently, there exists a need for a method or process which does not exhibit the disadvantages of the methods discussed above. The present invention provides such a process.

SUMMARY OF THE INVENTION

In accordance with the invention there is provided a method for preparing globular, hydrophilic copolymer having reticulated internal structural characteristics comprising polymerizing hydrophilic monomer with hydrophobic comonomer in an aqueous dispersion medium in the presence of diluents which substantially completely dissolve both monomers, while substantially suppressing the solubility of the hydrophilic monomer in the aqueous dispersion medium with an inert component which is soluble in the monomeric phase and nonmiscible with water.

When one of the monomers has a functionality of four or more, the reaction products are three dimensional copolymers which are either microreticular or macroporous, depending upon the character and concentration of the diluents used in the polymerization. That is to say that a higher concentration of the bad solvent (diluent) in the system results in increased pore size, leading to a macroporous structure. The content of the thermodynamically good solvent (diluent) determines the portion of microreticular structure (besides of the macroreticular one). Polymerization in absence of diluents results in formation of gels with exclusively microreticular character, provided that the polymer, formed in the first stage, dissolves in the monomer system. The reaction products so formed exhibit hydrophilic characteristics, being gels which swell in water and are particularly useful as packing of columns which are then used for gel and gas chromatography.

DESCRIPTION OF PREFERRED EMBODIMENTS

The inert component should be one that exhibits an expressive affinity to the hydrophilic monomer, as well as being a good solvent for the polymer being formed in order to avoid phase separation at higher concentrations of the cross-linking component, that is, the polyfunctional monomer, in the presence thereof. In addition, this component prevents the hydrophobic monomer from being extracted from the organic phase into the water while, at the same time, substantially suppressing the solubility of water in the monomeric organic phase. The presence of inert component permits the preparation of a gel copolymer with the required interior structure. Gel copolymers prepared in the presence of an inert component having the aforementioned properties are microreticular and their interior structures can be appropriately modified within a broad range depending upon the concentration of the cross-linking monomer.

On the other hand, to prepare macroreticular gel copolymers the polymerization reaction is carried out in a mixed solvent formed by mixing an inert component which prevents the hydrophilic monomer from being extracted and an organic compound which is a precipitant for the copolymer formed with the distribution of pore sizes in the copolymer being dependent on the content of the precipitant in the mixed solvent.

In general, when preparing microreticular gel copolymers according to the invention, their interior structures, as mentioned, can be modified within a broad range dependent upon the concentration of the cross-linking monomer. In this connection the concentration of cross-linking monomer, that is, the hydrophobic monomer can vary widely generally being employed in a minor proportion in a range of from about 2 parts to about 20 parts, by weight, based on the total weight of the monomeric phase, that is, both the hydrophilic monomer and hydrophobic monomer. Moreover, in general, as the concentration of the cross-linking monomer is increased, the internal structure of the copolymeric globules becomes more dense and the polymers so formed are suitable for separating compounds having molecular weights below about 4,000. In contrast, decreasing the concentration of cross-linking monomer results in copolymeric globules which are less dense and more suitable for separating compounds having molecular weights above about 4,000. However, decreasing the concentration of cross-linking copolymer below about 2 parts, concentration by weight results in copolymeric globules that are mechanically unstable and unsuitable for chromatographic separation.

In the preparation of the macro-reticular copolymers is the distribution of pore sizes in the polymer formed also dependent of the content of the precipitant employed. Generally, the precipitant is employed in a mixed solvent in an amount in a range of from about 2 parts to about 60 parts by weight, based on the total weight of the mixed solvent. The distribution of pore sizes is increasing as the concentration of precipitant is increased. The concentration of crosslinking agent varies widely between 2 and 99 parts.

Other than as mentioned above, the suspension polymerization is carried out with agitation or stirring and isolation of the reaction product is accomplished in the usual manner. Copolymerization is initiated by free radical initiators soluble in the monomeric phase and insoluble in water, such as aliphatic azo compounds, diacyl peroxides and the like employed in small amounts of generally less than about 1.0 percent by weight, based on the weight of the monomers. The reaction temperature may vary widely depending upon the initiator used but should be maintained substantially constant at the proper level for the particular initiator employed. Water soluble polymers which are commonly used as protective colloids can also be employed as suspension stabilizers. Such materials include polyvinylpyrrolidone, polyvinyl alcohol, starch and the like.

After substantially complete conversion to copolyer has been accomplished, the suspension thereof is separated from the suspension mechanism by filtration. The organic solvents can be removed by steam distillation or extraction with suitable low boiling solvents. The suspension stabilizers and other water soluble components are simply removed by repeated washing.

The copolymeric globular materials are then fractionated in either a wet or dry state on screens or by hydromechanical methods, such as flotation, sedimentation etc. The gels prepared which are microreticular may then be employed for gel chromatography of hydrophilic systems using water, acetone, methanol, ethanol and other polar solvents as eluents. The macroporous copolymer so formed may be employed in gel and gas chromatography methods.

Exemplative hydrophilic monomers which can be employed in the practice of this invention are hydrophilic monomers having a functionality of two or more and containing polar groups in the molecule, thereby being partially or substantially completely miscible with water such as hydroxyalkyl methacrylates, aminoalkyl methacrylates, N-vinylpyrrolidone, acrylonitrile, methacrylonitrile, acrylic acid, methacrylic acid and the like.

Exemplative hydrophobic comonomers are water insoluble hydrophobic vinylic monomers having a functionality of two or more and able to copolymerize with the hydrophilic monomers such as ethylene dimethacrylate, ethylene diacrylate, methylene-bis-acrylamide, diethylene glycol and poly (ethylene glycol) methacrylates, neopenthyl glycol diacrylate and dimethacrylate, trimethylol propane trimethacrylate, divinyl benzene and the like.

The inert component which prevents extraction of the hydrophilic monomers is an organic solvent such as cyclohexyl alcohol, cyclohexylamine, benzylalcohol and the like and which is liquid at the polymerization temperature, insoluble in water and is a good solvent for the copolymer, that is, at least swells the three dimensional copolymer and limits or suppresses the affinity of the hydrophilic monomer for water to substantially zero. The choice of the particular solvents used depends on the character of the hydrophilic monomer.

Examples of useful precipitants are organic compounds such as dodecyl alcohol, n-octyl alcohol, decyl alcohol, dibutyl ether, hexadecyl alcohol, n-hexadecyl acetate, dodecyl amine and the like which are liquids at the polymerization temperatures in the mixture of the monomer, comonomer and inert component and prevents extraction of the comonomer from the monomer phase, as well as being a bad solvent for the copolymer.

THE DRAWING

In the attached drawing, the graph illustrates the logarithm of molecular weights (log M) of standard exactly defined samples of dextrane (product of Pharmacia Uppsala) plotted against the corresponding elution volume (V e), concerning the given gel in Gel Chromatography. The diagram shows the utility for Gel Partition Chromatography and, indirectly, the pore size distribution in swollen condition in water.

THE EXAMPLES

In order to illustrate the invention more fully, the following examples are set forth. In the examples all parts and percents are by weight unless other indicated.

EXAMPLE 1

A glass reactor was charged with 7.45 parts of polyvinylpyrrolidone (molecular weight 750,000) and 745 parts of water and the mixture was agitated to dissolution. Into the homogeneous solution there were added 78 parts of 2-hydroxyethyl methacrylate, 25 parts of ethylene dimethacrylate, 143.5 parts of cyclohexanol and 1.03 parts of azo bis-isobutyronitrile. Nitrogen was intensively bubbled through the mixture for 20 minutes. The reactor was closed, the magnetic stirrer was set up to 600 r.p.m. and the mixture was heated to $70 \pm 1°$ C. The suspension polymerization lasted 12 hours. Then the mixture was steadily stirred and cooled down to the room temperature, the suspension was removed by filtration, washed with methanol, water, methanol, benzene and pertroleum ether and dried in air at the normal temperature. The product is powdery and does not contain clods or larger agglomerated lumps. The dry gel was fractionated by screening. The fraction having 30–50$\mu$ size was used for packing of a stainless steel column $8 \times 1,200$ mm and the gel was tested by means of 1 M acetic acid as an eluent. The calibration dependence of the elution volume of the defined testing compounds on their molecular weight is shown in the drawing (1 count $=2.7$ ml). The product obtained is a suitable packing material for chromatographic columns for analysis and preparation of low molecular weight compounds, such as opesaccharides oligepeptides, amino acids, oligonucleotides, organic acids, amines etc.

EXAMPLE II

Suspension copolymerization and processing of product were carried out as EXAMPLE I except that the mixture consisted of 750 parts of water, 7.5 parts of polyvinylpyrrolidone ($M_w = 50,000$), 78.4 parts of 2-hydroxyethyl methacrylate, 25.3 parts of ethylene dimethacrylate, 96.2 parts of cyclohexanol, 41.5 parts of dodecyl alcohol, and 1.04 parts of azo bis-isobutyronitrile. The copolymerization yielded a macroporous material suitable for packing of gel chromatographic columns for separation of hydrophilic high molecular weight compounds.

EXAMPLE III

Suspension copolymerization of 746.2 parts of water, 7.46 parts of polyvinylpyrrolidone, 77.1 parts of 2-hydroxyethyl methacrylate, 25.1 parts of ethylene dimethacrylate, 143.0 parts of cyclohexylamine, and 1.04 parts of azo bis-isobutyronitrile was carried out as in EXAMPLE I. The product is a microreticular gel suitable for gel chromatography.

EXAMPLE IV

Suspension copolymerization was carried out as in EXAMPLE I except that the mixture containing of 744 parts of water, 7.5 parts of poly vinyl alcohol, 98.6 parts of 2-hydroxyethyl methacrylate, 5.01 parts of ethylene dimethacrylate, 143.3 parts of cyclohexanol, and 1.03 parts of azo-bis-isobutyronitrile was heated for 12 hours and agitated at 700 r.p.m. The gel obtained has a separation limit of molecular weight equal to 1,200.

EXAMPLE V

Polymerization was carried out as in EXAMPLE I. The mixture consisted of 751.2 parts of water, 7.51 parts of polyvinylpyrrolidone, 77.92 parts of aminoethyl methacrylate, 32.16 parts of ethylene dimethacrylate, 96.12 parts of cyclohexanol, 34.03 parts of n-octyl alcohol, and 1.05 parts of azo bis-isobutyronitrile. The macro-porous material obtained exhibited the behaviour of anion exchange resin.

EXAMPLE VI

A mixture consisting of 600 parts of water, 190 parts of 2-hydroxyethyl acrylate, 10 parts of ethylene diacrylate, 100 parts of dodecyl alcohol, and 1.2 parts of dibenzoyl peroxide was agitated (700 r.p.m.) and heated to 60° C. for 8 hours. The macroporous copolymer obtained had a particle size of from 2–70.

As well as being useful in gel and gas chromatography, the hydrophilic materials prepared by the method of this invention can be used in hydrophilic varnishes and to impart hydrophilic properties to surfaces. The copolymers which have active functional groups can be used as ion exchange resins and selective ion exchange resin for organic compounds. Numerous other uses will be apparent to those skilled in the art.

It is to be understood that many variations of the embodiments of this invention may be made without departing from the spirit and scope thereof. It is to be understood, therefore, that this invention is not to be limited except as defined in the appended claims.

What is claimed is:

1. A method for preparing insoluble globular hydrophilic copolymers of macroreticulated internal structure comprising suspension polymerizing a mixture of
    (a) a hydroxylalkyl methacrylate, and
    (b) a hydrophobic monomer selected from the group consisting of ethylene dimethacrylate and ethylene diacrylate,
the hydroxyalkyl methacylate being present in amount of at least 70% by weight of said mixture, in an aqueous medium in the presence of a polymerization initiator and in the presence of
    (1) a first inert organic compound selected from the group consisting of cyclohexanol and cyclohexylamine, and
    (2) a second inert organic compound selected from the group consisting of dodecyl alcohol, n-octyl alcohol, decyl alcohol, dibutyl ether, hexadecyl alcohol, n-hexadecyl acetate and dodecyl amine, said first inert compound being soluble in the monomer mixture and insoluble in water, the value of the partition coefficient of the hydrophobic monomer between water and said first inert compound being limited to substantially zero, thus preventing extraction of the hydrophilic monomer into the aqueous phase, the second inert compound being insoluble in water, soluble in the monomer and being a precipitant for the copolymer, the inert organic compounds (1) and (2) being present in weight amount of from about 17.32% to about 18.36% of the weight of water present in said aqueous medium, the weight ratio between the compound (1) and the compound (2) being in the range of about 2.32:1 to 2.82:1.

2. A method according to claim 1 wherein the hydrophobic monomer is ethylene dimethacrylate.

3. A method according to claim 1 wherein the hydrophobic monomer is ethylene diacrylate.

4. A method according to claim 1 wherein said first inert organic compound is cyclohexanol.

5. A method according to claim 1 wherein said first inert organic compound is cyclohexylamine.

6. A method according to claim 1 wherein said second inert organic compound (2) is dodecyl alcohol.

7. A method according to claim 1 wherein said second inert organic compound (2) is n-octyl alcohol.

8. A method according to claim 1 wherein there is present a suspension stabilizer.

9. A method according to claim 8 wherein said suspension stabilizer is polyvinylpyrrolidone.

* * * * *